United States Patent
Sampathkumaran

(10) Patent No.: US 10,706,740 B2
(45) Date of Patent: Jul. 7, 2020

(54) SYSTEM AND METHOD FOR PROCESSING SENSOR DATA

(71) Applicant: SONY CORPORATION, Tokyo (JP)

(72) Inventor: Sriram Sampathkumaran, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 933 days.

(21) Appl. No.: 14/582,398

(22) Filed: Dec. 24, 2014

(65) Prior Publication Data

US 2016/0184686 A1    Jun. 30, 2016

(51) Int. Cl.
 *G09B 19/00* (2006.01)

(52) U.S. Cl.
 CPC ................ *G09B 19/0038* (2013.01)

(58) Field of Classification Search
 CPC .. G09B 19/0038; A63B 24/0003; A63B 69/38
 USPC .................................. 434/247, 461
 See application file for complete search history.

(56) References Cited

U.S. PATENT DOCUMENTS

| | | | |
|---|---|---|---|
| 6,227,990 B1 | 5/2001 | Wise et al. | |
| 8,206,249 B1 | 6/2012 | Wise | |
| 8,602,922 B2 | 12/2013 | Schwenger et al. | |
| 8,944,940 B2* | 2/2015 | Mettler ............ | G09B 19/0038 473/461 |
| 9,597,577 B2* | 3/2017 | Mace .............. | A63B 69/38 |
| 9,626,641 B2* | 4/2017 | Pisupati .......... | G06Q 10/0639 |
| 9,901,776 B2* | 2/2018 | Mettler ........... | A63B 24/0003 |
| 10,192,118 B2* | 1/2019 | Matsunaga ....... | G06K 9/00724 |
| 2005/0239583 A1* | 10/2005 | Damen ............ | A63B 24/0021 473/516 |
| 2006/0166737 A1* | 7/2006 | Bentley ........... | A61B 5/1122 463/30 |
| 2007/0105664 A1* | 5/2007 | Scheinert ......... | A63B 49/00 473/461 |
| 2007/0148624 A1* | 6/2007 | Nativ .............. | A63B 24/0003 434/258 |
| 2008/0085778 A1* | 4/2008 | Dugan ............. | A63B 69/3623 473/223 |
| 2008/0312010 A1* | 12/2008 | Marty ............. | A63B 24/0003 473/447 |
| 2010/0130298 A1* | 5/2010 | Dugan ............. | A63B 69/3623 473/223 |
| 2011/0183787 A1* | 7/2011 | Schwenger ....... | A63B 49/00 473/553 |
| 2011/0230274 A1* | 9/2011 | Lafortune ........ | A43B 3/0005 473/217 |
| 2012/0128203 A1* | 5/2012 | Nakaoka ......... | A63B 69/36 382/103 |
| 2012/0316004 A1* | 12/2012 | Shibuya .......... | A63B 24/0006 473/212 |
| 2012/0316005 A1* | 12/2012 | Shibuya .......... | G09B 19/003 473/212 |
| 2013/0018493 A1* | 1/2013 | Amini ............. | A63B 69/38 700/91 |

(Continued)

*Primary Examiner* — Thomas J Hong

(74) *Attorney, Agent, or Firm* — Chip Law Group

(57) ABSTRACT

Various aspects of a system and method to process sensor data are disclosed herein. In an embodiment, the method includes receipt of sensor data from one or more sensors associated with an item of sports equipment. The received sensor data is analyzed by use of an inference engine. One or more recommendations are generated based on the analyzed sensor data.

12 Claims, 6 Drawing Sheets

(56) References Cited

U.S. PATENT DOCUMENTS

| | | | |
|---|---|---|---|
| 2013/0018494 A1* | 1/2013 | Amini | A63B 24/0006 700/91 |
| 2013/0053190 A1* | 2/2013 | Mettler | G09B 19/0038 473/463 |
| 2013/0063432 A1* | 3/2013 | Kaps | G06T 13/40 345/419 |
| 2013/0095962 A1* | 4/2013 | Yamamoto | A63B 69/38 473/464 |
| 2013/0127866 A1* | 5/2013 | Yamamoto | G06T 11/206 345/440 |
| 2013/0238257 A1 | 9/2013 | Rajamani et al. | |
| 2014/0089243 A1 | 3/2014 | Oppenheimer | |
| 2014/0141907 A1* | 5/2014 | Schwenger | A63B 49/00 473/534 |
| 2014/0180451 A1* | 6/2014 | Marty | G09B 19/0038 700/91 |
| 2014/0206481 A1* | 7/2014 | Zuger | G06K 9/00342 473/463 |
| 2014/0288874 A1* | 9/2014 | Matsunaga | A61B 5/1126 702/141 |
| 2014/0378239 A1* | 12/2014 | Sato | G09B 19/0038 473/199 |
| 2015/0016685 A1* | 1/2015 | Matsunaga | G09B 19/0038 382/103 |
| 2015/0045153 A1* | 2/2015 | Thurman | A63B 69/38 473/553 |
| 2015/0051009 A1* | 2/2015 | Davenport | A63B 24/0003 473/223 |
| 2015/0057112 A1* | 2/2015 | Sak | A63B 24/0003 473/461 |
| 2015/0057777 A1* | 2/2015 | Mace | A63B 69/38 700/91 |
| 2015/0057778 A1* | 2/2015 | Mace | G09B 19/0038 700/91 |
| 2015/0057941 A1* | 2/2015 | Mace | G09B 19/0038 702/19 |
| 2015/0106050 A1* | 4/2015 | Shibuya | G01P 3/00 702/142 |
| 2015/0111657 A1* | 4/2015 | Shibuya | G06K 9/00342 473/223 |
| 2015/0119158 A1* | 4/2015 | Sato | G09B 19/0038 473/223 |
| 2015/0120021 A1* | 4/2015 | Kerhuel | A63B 69/38 700/91 |
| 2015/0141175 A1* | 5/2015 | Pisupati | G06Q 10/0639 473/461 |
| 2015/0157901 A1* | 6/2015 | Mace | A63B 24/0003 473/549 |
| 2015/0170530 A1* | 6/2015 | Damman | G06F 16/951 700/91 |
| 2015/0283428 A1* | 10/2015 | Shibuya | G01P 13/00 473/221 |
| 2015/0314164 A1* | 11/2015 | Sampathkumaran | G06F 19/3481 473/461 |
| 2015/0314165 A1* | 11/2015 | Sampathkumaran | A63B 71/0622 473/461 |
| 2015/0335946 A1* | 11/2015 | Crowder | A63B 24/0006 473/461 |
| 2015/0352404 A1* | 12/2015 | Schwenger | A63B 24/0003 700/91 |
| 2016/0045784 A1* | 2/2016 | Kim | A61B 5/1118 702/141 |
| 2016/0133152 A1* | 5/2016 | Arif | G09B 5/00 434/247 |
| 2016/0253553 A1* | 9/2016 | Watanabe | G09B 19/0038 700/91 |
| 2016/0271480 A1* | 9/2016 | Fukasawa | G09B 19/0038 |
| 2016/0314352 A1* | 10/2016 | Matsunaga | G06K 9/00724 |

* cited by examiner

SYSTEM AND METHOD FOR PROCESSING SENSOR DATA

FIELD

Various embodiments of the disclosure relate to processing sensor data. More specifically, various embodiments of the disclosure relate to processing sensor data to generate recommendations.

BACKGROUND

Currently, the role of sensors has expanded beyond traditional fields, such as temperature measurement or fluid flow measurement. Attempts have been made to develop, miniaturize, and/or customize various sensors for use in sports. Such sports-related sensors may provide a huge amount of sensor data. In certain scenarios, such huge amount of sensor data obtained from such sensors may not necessarily help a player to make an inference related to a game strategy.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method that processes sensor data to generate recommendations substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
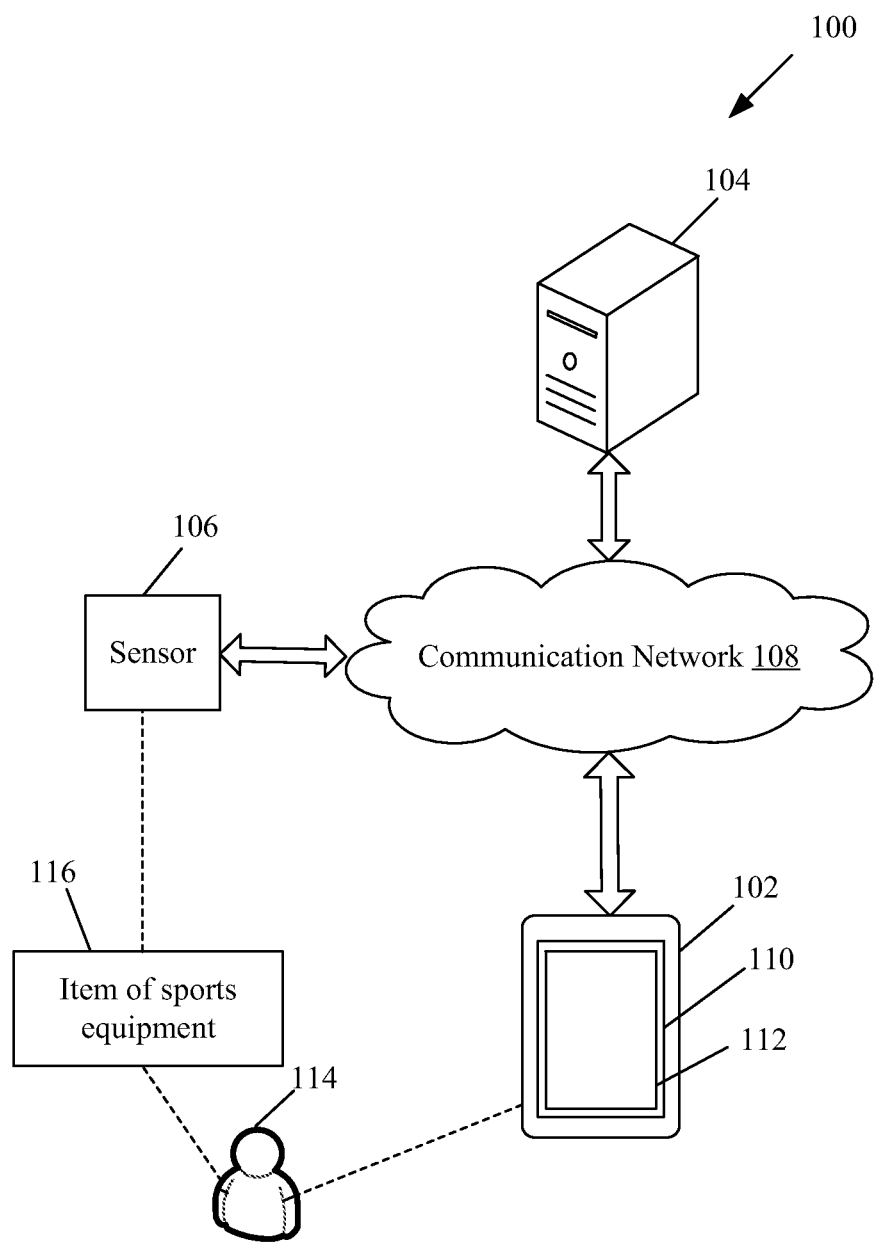
FIG. 1 is a block diagram that illustrates a network environment to process sensor data, in accordance with an embodiment of the disclosure.

The following described implementations may be found in disclosed systems and methods to process sensor data. Exemplary aspects of the disclosure may comprise a method that may receive sensor data from one or more sensors associated with an item of sports equipment. The received sensor data may be analyzed by use of an inference engine. One or more recommendations may be generated based on the analyzed sensor data.

In accordance with an embodiment, the received sensor data may correspond to pressure data exerted by a player on a hand grip of the item of sports equipment, string(s) tension data of the item of sports equipment, and/or a shot detection data that corresponds to contact of a moving object with the item of sports equipment. In accordance with an embodiment, the received sensor data may further correspond to stroke trajectory data of the item of sports equipment, trajectory detection data of a moving object, speed detection data of the moving object, geospatial positioning data of a player associated with the item of sports equipment, and/or footwork data of the player.

In accordance with an embodiment, the received sensor data may be categorized into a first set of sensor data and a second set of sensor data. The first set of sensor data may be associated with a first set of time periods. The second set of sensor data may be associated with a second set of time periods. The first set of time periods may correspond to a first set of timestamps when contact of the moving object with the item of sports equipment is detected. The second set of time periods may correspond to a second set of timestamps when the contact is not detected.

In accordance with an embodiment, the first set of sensor data may be graphically plotted on a user interface (UI) for one or more shots played. A current profile of the player may be generated based on the first set of sensor data. In accordance with an embodiment, one or more recommendations may be generated based on a comparison of the current profile of the player with a historical profile of the player. The one or more recommendations may be dynamically generated when a change in performance of the player is detected. Such a change in detection may occur based on a comparison of the current profile of the player with a pre-stored profile of another player.

In accordance with an embodiment, the received sensor data may be compared with one or more predetermined threshold values. Based on the comparison, the one or more recommendations may be dynamically generated when a change in one or more physical attributes of the item of sports equipment is detected. In accordance with an embodiment, the generated one or more recommendations may be displayed on the UI. In accordance with an embodiment, such display may occur based on a pre-determined proximity of one or more processors of the system to the one or more sensors. In accordance with an embodiment, the analyzed data may be re-analyzed based on a user preference. The user preference may be received via the UI.

FIG. 1 is a block diagram that illustrates a network environment to process sensor data, in accordance with an embodiment of the disclosure. With reference to FIG. 1, there is shown a network environment 100 that includes an electronic device 102, a server 104, sensors 106, a communication network 108, a display screen 110, a user interface (UI) 112, one or more players, such as a player 114, and an item of sports equipment 116.

The electronic device 102 may be communicatively coupled to the server 104 and the sensors 106, via the communication network 108. The electronic device 102 may include the display screen 110 that may display the UI 112. The electronic device 102 and the item of sports equipment 116 may be associated with the player 114. The item of sports equipment 116 may be further associated with the sensors 106.

The electronic device 102 may comprise suitable logic, circuitry, interfaces, and/or code that may be operable to generate one or more recommendations that may be displayed on the UI 112. Examples of the electronic device 102 may include, but are not limited to, a smartphone, a tablet computer, a laptop, a wearable electronic device, a television, a projector, an Internet Protocol Television (IPTV), and/or a Personal Digital Assistant (PDA) device.

The server 104 may comprise suitable logic, circuitry, interfaces, and/or code that may be operable to provide support to one or more subscribed devices, such as the electronic device 102, to analyze the sensor data received from the sensors 106. The server 104 may further provide a support to the electronic device 102 to generate one or more recommendations based on the analyzed data. The server 104 may be associated with a remote memory (not shown) that may store historical profile of the player 114 and profiles of other players. The server 104 may be implemented by use of several technologies that are well known to those skilled in the art. Examples of the server 104 may include, but are not limited to, Apache™ HTTP Server, Microsoft® Internet Information Services (IIS), IBM® Application Server, and/or Sun Java™ System Web Server.

The sensors 106 may comprise suitable logic, circuitry, and/or interfaces that may be operable to detect events and/or physical or quantitative attributes of the associated item of sports equipment 116, such as the racquet. The output of the sensors 106 may be sensor data based on the detected events and/or physical or quantitative attributes. The sensors 106 may be operable to communicate sensor data to one or more devices, such as the electronic device 102 and the server 104. Examples of the sensors 106 may include, but are not limited to, a pressure mat for detection of pressure exerted by the player 114 on a hand grip of the item of sports equipment 116, a sensor for measurement of tension in string(s) of the item of sports equipment 116, a sensor for detection of contact of a moving object with the sports equipment, a stroke-trajectory sensor, a sensor for detection of trajectory of a moving object, a sensor to detect speed and/or spin of the moving object, a geospatial positioning detection sensor, a sensor to detect footwork of the player 114, and/or a heart-rate monitoring sensor. Examples of the item of sports equipment 116 may include, but are not limited to, a tennis racquet, a badminton racquet, a squash racquet, a racquetball racquet, a cricket bat, a baseball bat, a hockey stick, a lacrosse stick, and/or other racquets, sticks or bats. Examples of the moving object may include, but are not limited to, a ball, a shuttlecock, and/or a hockey puck.

The communication network 108 may include a medium through which the electronic device 102 may communicate with one or more servers, such as the server 104. Examples of the communication network 108 may include, but are not limited to, the Internet, a cloud network, a Wireless Fidelity (Wi-Fi) network, a Wireless Local Area Network (WLAN), a Local Area Network (LAN), a plain old telephone service (POTS), a Metropolitan Area Network (MAN), and/or a short-range communication medium. Various devices in the network environment 100 may be operable to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, infrared (IR), IEEE 802.11, 802.16, cellular communication protocols, near-field communication (NFC) protocol, and/or Bluetooth (BT) communication protocols.

The display screen 110 may comprise suitable logic, circuitry, interfaces, and/or code that may be operable to display the UI 112. The display screen 110 may be further operable to render one or more features and/or applications of the electronic device 102. The display screen 110 may be realized through several known technologies, such as but not limited to, Liquid Crystal Display (LCD) display, Light Emitting Diode (LED) display, and/or Organic LED (OLED) display technology.

In operation, the sensors 106 associated with the item of sports equipment 116 (such as a racquet) held by the player 114, may be operable to detect sensor data. The sensor data may be detected for a game play at different timestamps, such as at the start of the game, during the game and/or at the end of the game. In an embodiment, the sensors 106 may be operable to communicate the detected sensor data to the electronic device 102.

In accordance with an embodiment, the electronic device 102 may be operable to receive the sensor data. The electronic device 102 may be further operable analyze the received sensor data by use of an inference engine. In an embodiment, the electronic device 102 may be operable to categorize the received sensor data into a first set of sensor data and a second set of sensor data. The first set of sensor data may be associated with a first set of time periods. The second set of sensor data may be associated with a second set of time periods.

The electronic device 102 may be operable to compare the sensor data, such as the first set of sensor data, received from the one or more sensors 106, with one or more predetermined threshold values. The electronic device 102 may be operable to generate a current profile of the player 114 based on the first set of sensor data. The current profile of the player 114 may indicate the performance of the player 114 for the current game play.

In accordance with an embodiment, the electronic device 102 may be operable to compare the current profile of the player 114 with a historical profile of the player 114. The historical profile may be retrieved from a local memory associated with the electronic device 102 or the remote memory associated with the server 104. In accordance with an embodiment, the electronic device 102 may be operable to compare the current profile of the player 114 with a pre-stored profile of another player. The profile of the other player may be retrieved from the local memory or the remote memory.

In accordance with an embodiment, the electronic device 102 may be operable to generate one or more recommendations based on the analyzed sensor data. The electronic device 102 may be operable to generate the one or more recommendations dynamically when a change in performance of the player 114 is detected based on the comparison of the current profile of the player 114 with the profile of another player. The electronic device 102 may be operable to display the generated one or more recommendations on the UI 112. In accordance with an embodiment, the electronic device 102 may be operable to graphically plot the first set of sensor data on the UI 112. Such plotting may occur for one or more shots played by the player 114. In accordance with an embodiment, the electronic device 102 may be operable to re-analyze the analyzed data based on a user preference. The user preference may be receive via the UI 112.

Figure 2:
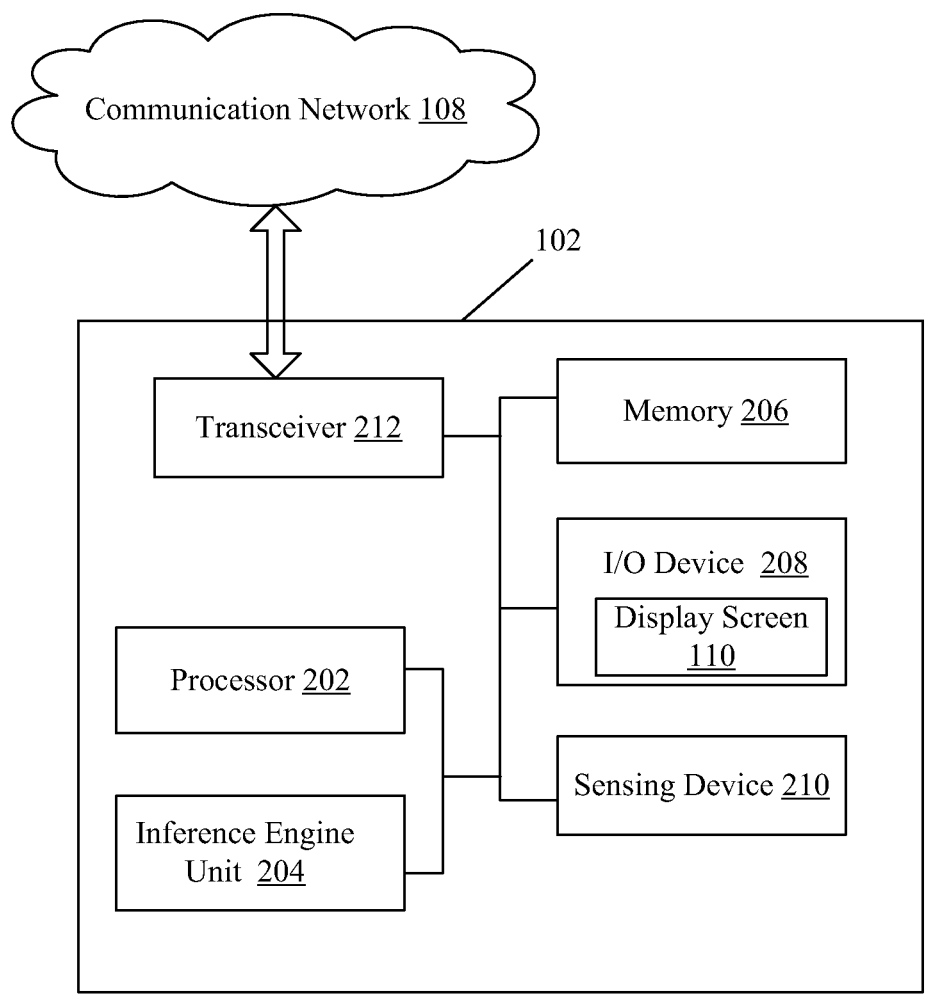
FIG. 2 is a block diagram that illustrates an exemplary electronic device, in accordance with an embodiment of the disclosure.

FIG. 2 is a block diagram that illustrates an exemplary electronic device 102, in accordance with an embodiment of the disclosure. FIG. 2 is explained in conjunction with elements from FIG. 1. With reference to FIG. 2, there is shown the electronic device 102. The electronic device 102 may comprise one or more processors, such as a processor 202, an inference engine unit 204, a memory 206, one or more input/output (I/O) devices, such as an I/O device 208, one or more sensing devices, such as a sensing device 210, and a transceiver 212. The I/O device 208 may include the display screen 110.

The processor 202 may be communicatively coupled to the inference engine unit 204, the memory 206, the I/O device 208, the sensing device 210, and the transceiver 212. The transceiver 212 may be operable to communicate with the one or more sensors, such as the sensors 106, via the communication network 108. The transceiver 212 may be further operable to communicate with one or more servers, such as server 104, via the communication network 108.

The processor 202 may comprise suitable logic, circuitry, interfaces, and/or code that may be operable to execute a set of instructions stored in the memory 206. The processor 202 may be implemented based on a number of processor technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The inference engine unit 204 may comprise suitable logic, circuitry, interfaces, and/or code that may be operable to intelligently analyze the sensor data received from the sensors 106. In an embodiment, the inference engine unit 204 may be a part of the processor 202. In an embodiment, both the inference engine unit 204 and the processor 202 may be implemented as a cluster of processors or an integrated processor that performs the functions of the inference engine unit 204 and the processor 202. In accordance with an embodiment, the inference engine unit 204 may be implemented in the server 104. The inference engine unit 204 may be implemented based on one or more approaches, such as an artificial neural network (ANN), an inductive logic programming approach, a support vector machine (SVM), an association rule learning approach, a decision tree learning approach, and/or a Bayesian network. Notwithstanding, the disclosure may not be so limited and any suitable learning approach may be utilized without limiting the scope of the disclosure. Examples of the inference engine unit 204 may be an X86-based processor, a Reduced Instruction Set Computing (RISC) processor, an Application-Specific Integrated Circuit (ASIC) processor, a Complex Instruction Set Computing (CISC) processor, and/or other processors.

The memory 206 may comprise suitable logic, circuitry, and/or interfaces that may be operable to store a machine code and/or a computer program with at least one code section executable by the processor 202. The memory 206 may further be operable to store information from one or more profiles (such as the profile of the player 114), one or more text-to-speech conversion algorithms, one or more speech-generation algorithms, and/or other data. The memory 206 may further be operable to store operating systems and associated applications. Examples of implementation of the memory 206 may include, but are not limited to, Random Access Memory (RAM), Read Only Memory (ROM), Hard Disk Drive (HDD), Flash memory, and/or a Secure Digital (SD) card.

The I/O device 208 may comprise suitable logic, circuitry, interfaces, and/or code that may be operable to receive an input from the player 114. The I/O device 208 may be further operable to provide an output to the player 114. The I/O device 208 may comprise various input and output devices that may be operable to communicate with the processor 202. Examples of the input devices may include, but are not limited to, a touch screen, a keyboard, a mouse, a camera, a gesture sensor, a joystick, a microphone, a motion sensor, a light sensor, and/or a docking station. Examples of the output devices may include, but are not limited to, the display screen 110, a projector screen, a holographic projection film, and/or a speaker.

The sensing device 210 may comprise suitable logic, circuitry, and/or interfaces that may be operable to store a machine code and/or a computer program with at least one code section executable by the processor 202. The sensing device 210 may comprise one or more sensors 106 to confirm recognition, identification, and/or verification of the player 114. The one or more sensors may further include a microphone to detect a voice pattern of the player 114, and a proximity sensor to detect proximity of other sport-related sensors, such as the sensors 106. The one or more sensors may comprise capacitive-touch sensors to detect one or more touch-based input actions received from the player 114, via the UI 112.

The transceiver 212 may comprise suitable logic, circuitry, interfaces, and/or code that may be operable to communicate with one or more other sport-related sensors, such as the sensors 106. The transceiver 212 may be operable to communicate with one or more servers, such as the server 104, via the communication network 108. The transceiver 212 may implement known technologies to support wired or wireless communication of the electronic device 102 with the communication network 108. The transceiver 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The transceiver 212 may communicate, via wireless communication with networks, such as communication network 108. The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), Wi-MAX, NFC protocol, a protocol for email, instant messaging, and/or Short Message Service (SMS).

In operation, the sensing device 210 may be operable to confirm recognition, identification, and/or verification of the player 114 for authentication. The transceiver 212 may be operable to receive sensor data from other sport-related sensors, such as the sensors 106. The sensors 106 may be associated with the item of sports equipment 116 (such as a racquet) held by the player 114. The sensors 106 may be operable to detect sensor data for a game play of the player 114 at different timestamps, such as at the start of the game, during the game and/or at the end of the game. The sensor data may include an identification (ID) data of the item of sports equipment 116 with which the one or more sensors, such as the sensors 106, may be associated. The sensor data may further comprise pressure data exerted by the player 114 on a hand grip of the item of sports equipment 116, string(s)-tension data of the item of sports equipment 116, and/or a shot detection data that corresponds to contact of a moving object with the item of sports equipment 116. The sensor data may further comprise stroke-trajectory data of the item of sports equipment 116, trajectory-detection data of the moving object, speed detection data of the moving object associated with the item of sports equipment 116, geospatial positioning data, and/or footwork data of the player 114 associated with the item of sports equipment 116. The sensors 106 may be operable to communicate the detected sensor data to the electronic device 102, via the communication network 108.

The transceiver 212 may be operable to receive the sensor data, via the communication network 108. The transceiver 212 may be further operable to communicate the received sensor data to the processor 202. The processor 202 may be operable to dynamically analyze the received sensor data by use of an inference engine, such as the inference engine unit 204. The inference engine unit 204 may be operable to dynamically analyze the received sensor data based on knowledge deduced from facts. The facts may be retrieved from an associated knowledge base (not shown). The associated knowledge base may comprise the facts that may correspond to the historical profile of the player 114 and profiles of other players. The associated knowledge base may be implemented in the electronic device 102 or the server 104. The inference engine unit 204 may be operable to apply logical rules to the facts retrieved from the associated knowledge base to deduce the knowledge that may be used for the analysis. In accordance with an embodiment, the inference engine unit 204 may be operable to retrieve the logical rules from the memory 206.

In accordance with an embodiment, such analysis may occur dynamically in real-time whenever the updated sensor data is received from the sensors 106. In accordance with another embodiment, such analysis may occur based on an input provided by a user (such as the player 114), via the UI 112. In accordance with another embodiment, such analysis may occur based on a pre-set configuration of the processor 202 and/or the inference engine unit 204.

In accordance with an embodiment, the processor 202 may be further operable to categorize the received sensor data into a first set of sensor data and a second set of sensor data. The first set of sensor data may be associated with a first set of time periods. The second set of sensor data may be associated with a second set of time periods. The first set of time periods may correspond to a first set of timestamps when contact of the moving object, such as a tennis ball, with the item of sports equipment 116, such as a tennis racquet, is detected. The second set of time periods may correspond to a second set of timestamps when such contact is not detected.

In accordance with an embodiment, the processor 202 may be operable to compare the received sensor data with one or more predetermined threshold values. The predetermined threshold values may be either manually provided by the player 114, via the UI 112, or automatically set by the processor 202 based on standard known values.

The processor 202 may be operable to generate a current profile of the player 114 for the current game play, based on the first set of sensor data. In accordance with an embodiment, the electronic device 102 may be operable to compare the current profile of the player 114 with a historical profile of the player 114. In accordance with another embodiment, the electronic device 102 may be operable to compare the current profile of the player 114 with a pre-stored profile(s) of other player(s). The profile(s) of the other player(s) may be pre-stored in the memory 206 or the remote memory associated with the server 104.

Based on the comparisons, the processor 202 may be operable to generate one or more recommendations for the player 114. The generated recommendations may be suggestions, value-added information related to performance of the player 114, opinions, factual data of play in one or more sports events, and/or performance trends analysis results. In accordance with an embodiment, the player 114 may provide an input, via the UI 112, to generate the one or more recommendations. In accordance with an embodiment, the one or more recommendations may be generated dynamically by the processor 202. In accordance with an exemplary scenario, the one or more recommendations may indicate a change in performance of the player 114 based on the comparisons. For example, the dynamically generated one or more recommendations for the player 114 may be presented as, "Your performance for this game is better than the last one. But still not as good as the performance of <other player name>. For that, you need to improve your footwork."

In accordance with an embodiment, the one or more recommendations may be generated dynamically when a change in one or more physical or quantitative attributes in the item of sports equipment 116, such as reduced string tension of the racquet, is detected. Such a change in the one or more physical attributes may be detected based on the comparison of the current sensor data with the one or more predetermined threshold values, as described above.

The processor 202 may be operable to display the generated one or more recommendations on the UI 112. In accordance with an embodiment, the processor 202 may be operable to output the generated one or more recommendations via one or more cues, such as a light-based indication, a vibration-based indication, and/or a sound-based indication. Such cues may enable the player 114 to avoid inadvertently missing receipt of the generated one or more recommendations.

In accordance with an embodiment, the processor 202 may be operable to receive input, via the UI 112, to graphically plot the first set of sensor data. The processor 202 may be operable to graphically plot the first set of sensor data on the UI 112. Such a graphical plot may represent analysis of one or more shots played by the player 114 during the current game play.

In accordance with an embodiment, the processor 202 may be operable to re-analyze the analyzed data based on a user preference. The user preference may be provided by the player 114, via UI 112. For example, the processor 202 may be operable to filter or add sensor data received from one of the sensors 106 for another analysis or graphical representation. In accordance with an embodiment, the received sensor data, profiles (such as the generated current profile and/or profile of another player), and/or generated recommendations may be stored in one or more servers, such as the server 104.

Figure 3:
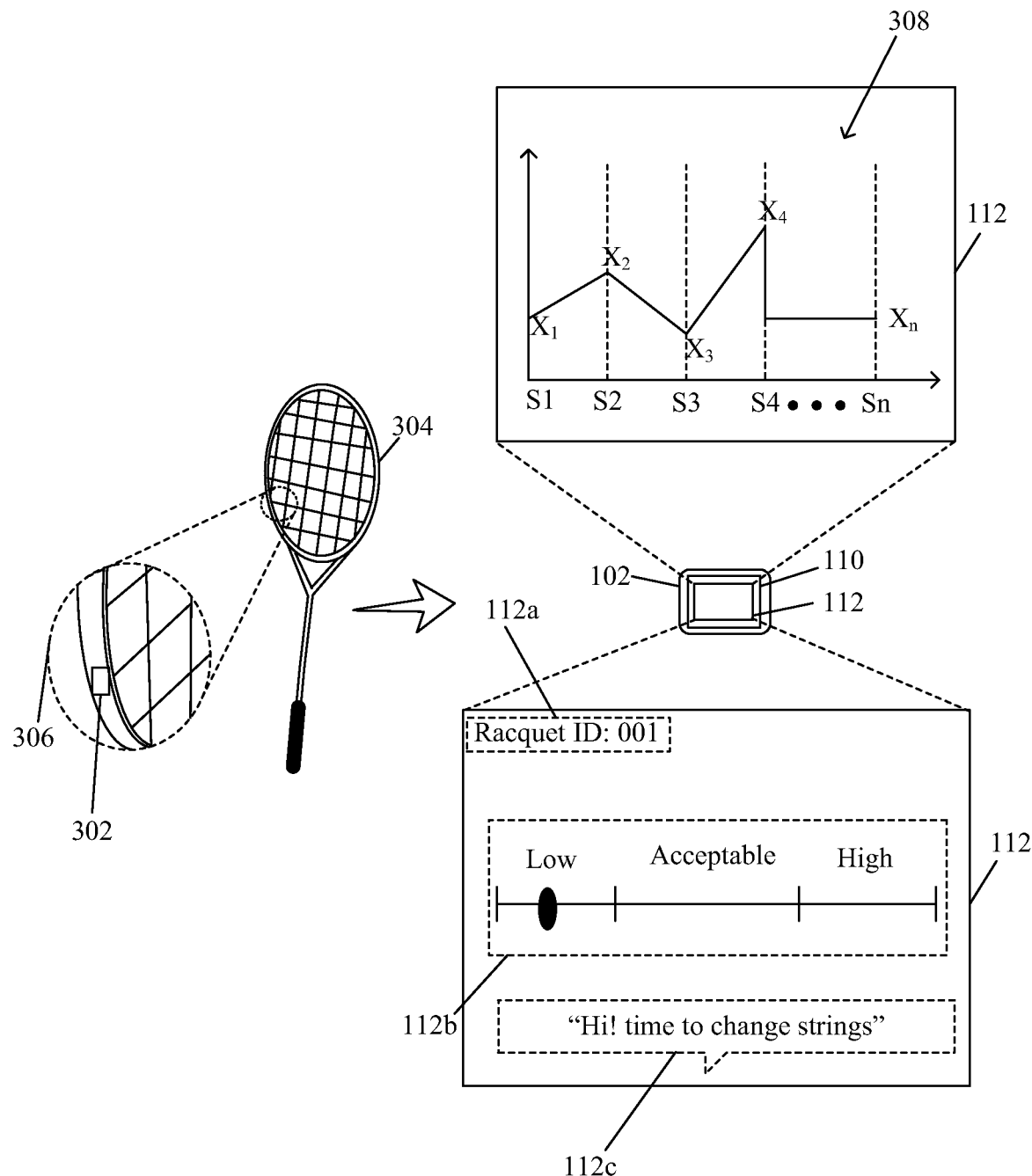
FIG. 3 illustrates a first exemplary scenario for implementation of the disclosed system and method to process sensor data, in accordance with an embodiment of the disclosure.

FIG. 3 illustrates a first exemplary scenario for the implementation of the disclosed system and method to process sensor data, in accordance with an embodiment of the disclosure. With reference to FIG. 3, there is shown a microsensor 302, a racquet 304, a dotted line representation 306, and a graph 308. There is further shown a first indicator 112a, a second indicator 112b, and a recommendation message 112c, that may be displayed on predetermined portions of the UI 112.

The microsensor 302 and the racquet 304, as shown in FIG. 3, may correspond to the sensors 106 and the item of sports equipment 116, as shown in FIG. 1. The first indicator 112a may correspond to identification of the racquet 304. The second indicator 112b may correspond to the sensor data (as shown in FIG. 1). The recommendation message 112c and the graph 308 may correspond to the generated one or more recommendations and the graphical plot (as shown in FIG. 1). In an instance, the microsensor 302 may be adapted to be located at a frame of the racquet 304, as magnified by the dotted line representation 306. In another instance, the microsensor 302 may be adapted to reside at the frame where the two ends of a pair of strings forms a knot (not shown).

In operation, a player, such as the player 114 may place the electronic device 102 in close proximity to the microsensor 302 of the racquet 304. The processor 202 may be operable to receive the sensor data, such as the tension measurement data, from the microsensor 302. In an instance, the received sensor data may include the racquet identifier.

In accordance with an embodiment, the processor 202 may be operable to compare the sensor data (tension measurement data) received from the microsensor 302 with a predetermined threshold value. The predetermined threshold value may correspond to a standard value, such as tension value in the strings of the racquet 304 as suggested by a manufacturer and/or sports experts. The predetermined threshold value may also correspond to a value set by the player 114 based on the preference of the player 114.

In accordance with an embodiment, the processor 202 may be operable to analyze the received sensor data (tension measurement data) by use of an inference engine, such as the inference engine unit 204. In an embodiment, the electronic device 102 may be operable to generate one or more recommendations, such as the recommendation message 112c. The received sensor data (tension measurement data) may be presented via the second indicator 112b. The processor 202 may be operable to display the generated first indicator 112a, the second indicator 112b, and the recommendation message 112c, on pre-determined portions of the UI 112. The first indicator 112a may present the racquet identifier, such as "Racquet ID: 001", of the racquet 304. The second indicator 112b may present the current status, such as, "Low", "Acceptable", or "High", of the sensor data in a specific presentation format. The recommendation message 112c, such as "Hi! Time to change strings", may present the message based on the analysis of the sensor data. Such display may occur based on the close proximity and/or physical contact of the electronic device 102 to the microsensor 302 of the racquet 304.

In accordance with an embodiment, the processor 202 may be operable to categorize sensor data, such as the tension measurement data, into a first set of sensor data and a second set of sensor data. The first set of sensor data, such as tension data, "$X_1$" to "$X_n$", may be associated with a first set of time periods. The first set of time periods may correspond to a set of timestamps when contact of the ball with the racquet 304 is detected.

The processor 202 may be operable to graphically plot the first set of sensor data on the UI 112, such as shown in the graph 308. The graphical plotting may occur for tension data, "$X_1$" to "$X_n$", with respect to one or more shots played, such as shots, "S1" to "Sn". Such shots, "S1" to "Sn", may be representative of one or more shots played by the player 114 in one or more sports events. In accordance with an embodiment, such representation of the graphical plot may occur based on a preset configuration to graphically plot the first set of sensor data when the electronic device 102 is in close proximity of the microsensor 302 of the racquet 304.

Figure 4:
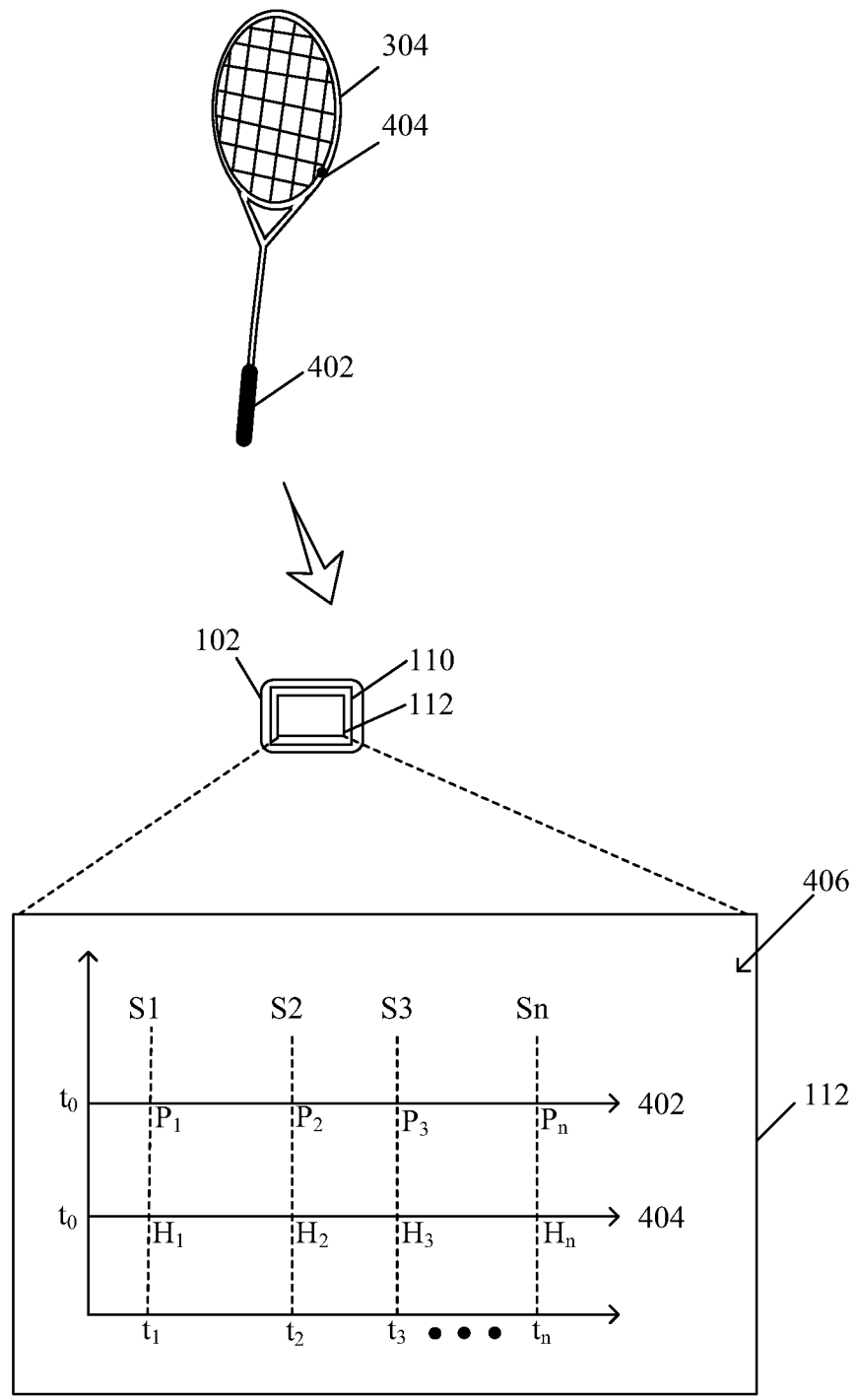
FIG. 4 illustrates a second exemplary scenario for implementation of the disclosed system and method to process sensor data, in accordance with an embodiment of the disclosure.

FIG. 4 illustrates a second exemplary scenario for the implementation of the disclosed system and method to process sensor data, in accordance with an embodiment of the disclosure. FIG. 4 is explained in conjunction with elements from FIG. 1, FIG. 2, and FIG. 3. With reference to FIG. 4, there is shown a pressure mat 402, a racquet sensor 404 and a graph 406.

The pressure mat 402 may detect hand pressure exerted by the player 114 on a hand grip of the racquet. The racquet sensor 404 may detect contact of a ball (not shown) with the racquet 304. The graph may be presented on the UI 112. The pressure mat 402 and the racquet sensor 404 may correspond to the sensors 106, as shown in FIG. 1.

In accordance with the second exemplary scenario, the processor 202 may be operable to receive an input, via the UI 112, to graphically plot the first set of sensor data, such as the pressure data, "$P_1$" to "$P_n$", and the ball hit data, "$H_1$" to "$H_n$". The first set of sensor data may be associated with a first set of time periods, such as time, "$t_1$" to "$t_n$". The time, "$t_1$" to "$t_n$", corresponds to the time when contact of the ball with the racquet 304 is detected. Such detection may use the ball hit data, "$H_1$" to "$H_n$".

In accordance with an embodiment, the processor 202 may be operable to analyze the received sensor data, such as the pressure data, "$P_1$" to "$P_n$", and the ball hit data, "$H_1$" to "$H_n$". Such analysis may occur by use of an inference engine, such as the inference engine unit 204. In an embodiment, the processor 202 may be operable to graphically plot the first set of sensor data on the UI 112 as the graph 406. The representation of graphical plot may occur for one or more shots played, such as shots, "S1" to "Sn", during a game play of a sports event. Such a representation of the graphical plot may occur in response to the input provided by the player 114, via the UI 112, to graphically plot the first set of sensor data.

In accordance with an embodiment, the processor 202 may be operable to re-analyze the analyzed data based on a user preference. The user preference may be received from the player 114, via UI 112. For example, sensor data received from the microsensor 302 (as shown in FIG. 3) may be added for additional analysis and/or representation in the graph 406.

In accordance with an embodiment, the processor 202 may be operable to receive input, via the UI 112, to generate one or more recommendations. The processor 202 may be operable to compare the current profile of the player 114 with a historical profile of the player 114. The recommendations may be based on the comparison, such as the comparison of the current profile with the historical profile of the player 114 or other profiles of other players.

In accordance with an embodiment, the recommendations may be value-added information, such as, "You played a total of eighty shots in last game", "Pressure on the hand grip of the racquet during first ten shots detected very high (above <threshold value> and/or based on the previous sports events)". The recommendations may be suggestions, such as "Hold the lower part of the hand grip of the racquet for optimum performance during start of the sports event". In an instance, the recommendations may be a display message, presented at a predetermined portion of the UI 112. In an instance, the recommendations may be an audio output, generated by an output device, such as speakers.

Figure 5A:
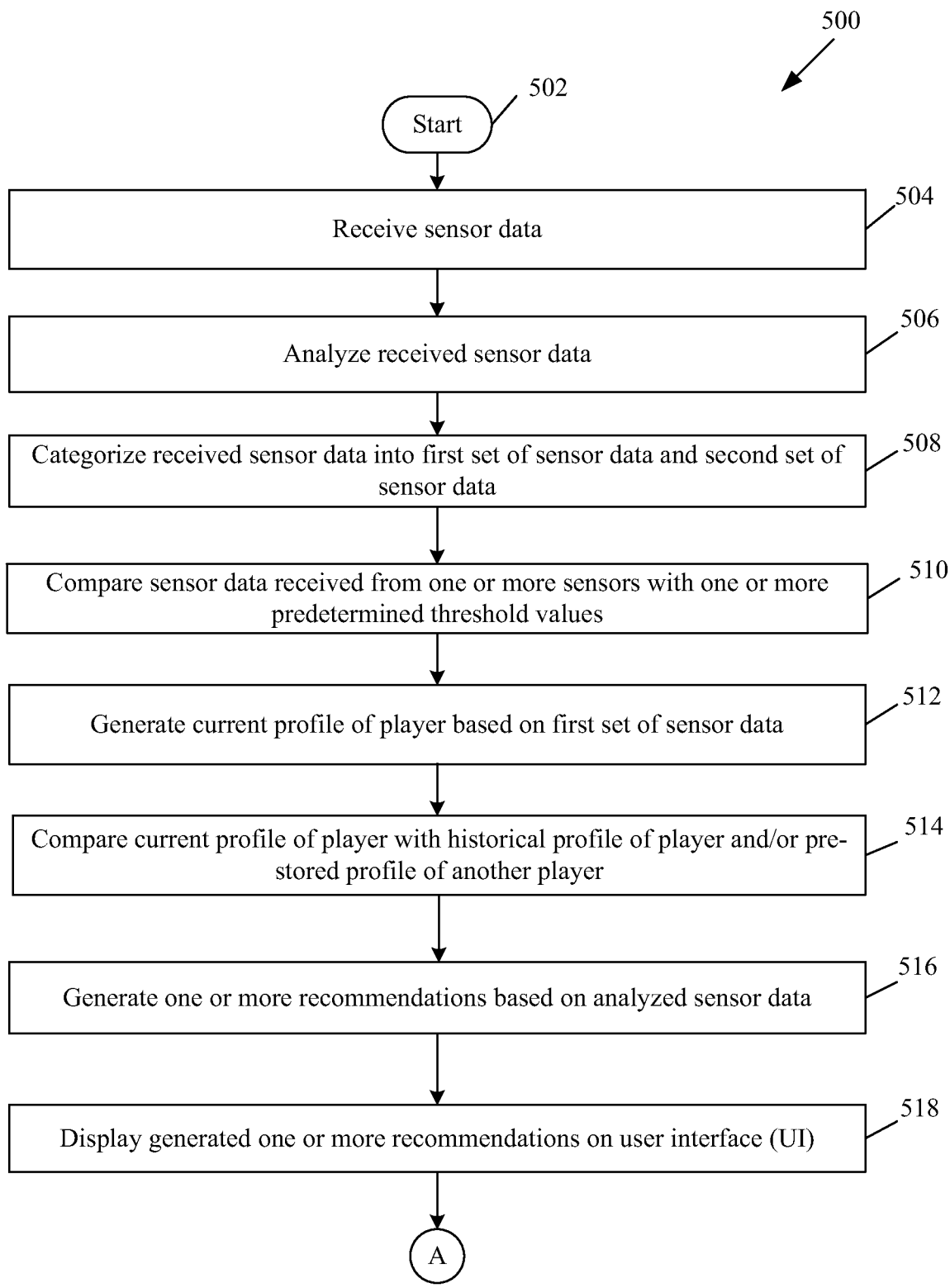
FIGS. 5A and 5B collectively represent a flow chart that illustrates an exemplary method to process sensor data, in accordance with an embodiment of the disclosure.
Figure 5B:
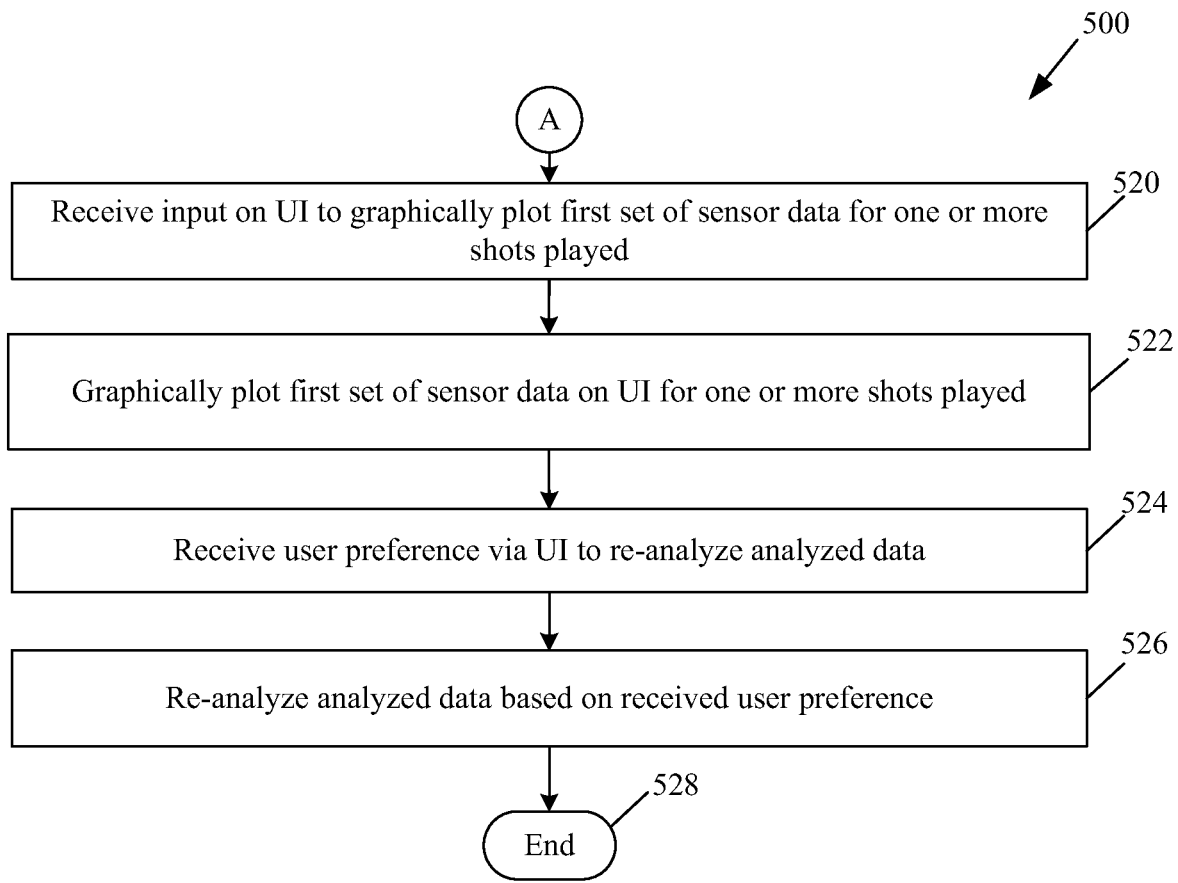

FIGS. 5A and 5B collectively represent a flow chart 500 that illustrates an exemplary method to process sensor data, in accordance with an embodiment of the disclosure. With reference to FIG. 5, there is shown a flow chart 500. The flow chart 500 is described in conjunction with FIGS. 1 and 2. The method starts at step 502 and proceeds to step 504.

At step 504, sensor data may be received from the sensors 106 associated with the item of sports equipment 116. At step 506, the received sensor data may be analyzed. At step 508, the received sensor data may be categorized into a first set of sensor data and a second set of sensor data. The first set of sensor data may be associated with a first set of time periods and the second set of sensor data may be associated with a second set of time periods. At step 510, the received sensor data may be compared with one or more predetermined threshold values.

At step 512, a current profile of the player 114 may be generated based on the first set of sensor data. At step 514, the current profile of the player 114 may be compared with a historical profile of the player 114. The current profile of the player 114 may be further compared with a pre-stored profile of another player. At step 516, one or more recommendations may be generated based on the analyzed sensor data.

At step 518, the generated one or more recommendations may be displayed. At step 520, an input may be received on the UI 112, to graphically plot the first set of sensor data for one or more shots played. The first set of sensor data may be displayed on the UI 112. At step 522, the first set of sensor data may be graphically plotted on the UI 112 for one or more shots played. At step 524, a user preference may be received on the UI 112, to re-analyze the analyzed data. At step 526, the analyzed data may be re-analyzed based on the received user preference. Control passes to end step 528.

In accordance with an embodiment of the disclosure, a system to process sensor data is disclosed. The electronic device 102 may comprise one or more circuits or processors (hereinafter referred to as the processor 202 (FIG. 2)). The processor 202 may be operable to receive sensor data from one or more sensors 106 associated with the item of sports equipment 116. The processor 202 may be further operable to analyze the received sensor data by use of an inference engine, such as the inference engine unit 204. The processor 202 may be further operable to generate one or more recommendations based on the analyzed sensor data.

Various embodiments of the disclosure may provide a non-transitory computer readable medium and/or storage medium, and/or a non-transitory machine readable medium and/or storage medium having stored thereon, a machine code and/or a computer program having at least one code section executable by a machine and/or a computer to process sensor data. The at least one code section in the electronic device 102 may cause the machine and/or computer to perform the steps comprising receipt of sensor data from one or more sensors 106 associated with a sports equipment 116, such as the racquet. The received sensor data may be analyzed by use of an inference engine, such as the inference engine unit 204. One or more recommendations may be generated based on the analyzed sensor data.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system, comprising:
   a display screen;
   a memory configured to store instructions; and
   one or more circuits configured to execute said instructions stored in said memory to:
      receive sensor data from at least one sensor associated with an item of sports equipment, wherein said at least one sensor includes a stroke-trajectory sensor;
      graphically plot said received sensor data on a user interface (UI) of said display screen for at least one shot played;
      determine a first set of sensor data among said received sensor data that is received during a contact of said item of sports equipment with a moving object, wherein said first set of sensor data corresponds to a first set of timestamps at which said contact of said moving object with said item of sports equipment is detected;
      analyze, in real time, said first set of sensor data;
      generate a current profile of a first player based on said analyzed first set of sensor data, wherein
         said first player is associated with said item of sports equipment, and
         said current profile of said first player indicates a performance of said first player;
      compare said current profile of said first player with a first profile of a second player, wherein said first profile of said second player is retrieved from said memory;
      determine a change in said performance of said first player based on said comparison and said analyzed first set of sensor data;
      generate at least one recommendation based on said determined change in said performance of said first player; and
      control said display screen to display said generated at least one recommendation, wherein
         said generated at least one recommendation is displayed on said UI of said display screen.

2. The system as claimed in claim 1, wherein
said received sensor data corresponds to at least one of pressure data exerted by said first player on a hand grip of said item of sports equipment or shot detection data that corresponds to said contact between said moving object and said item of sports equipment.

3. The system as claimed in claim 1, wherein
said received sensor data corresponds to at least one of stroke trajectory data of said item of sports equipment, trajectory detection data of said moving object associated with said item of sports equipment, speed detection data of said moving object, or geospatial positioning data of said first player associated with said item of sports equipment.

4. The system as claimed in claim 1, wherein
said one or more circuits are further configured to generate said at least one recommendation based on comparison of said current profile of said first player with a historical profile of said first player.

5. The system as claimed in claim 1, wherein
said one or more circuits are further configured to compare said received sensor data with at least one threshold value.

6. The system as claimed in claim 5, wherein said one or more circuits are further configured to:
detect a change in at least one physical attribute based on said comparison with said at least one threshold value; and
dynamically generate said at least one recommendation based on said change in said at least one physical attribute of said item of sports equipment.

7. The system as claimed in claim 1, wherein
said one or more circuits are further configured to re-analyze said analyzed first set of sensor data based on a user preference, and
said user preference is received via said UI.

8. A method, comprising:
in an electronic device:
receiving sensor data from at least one sensor associated with an item of sports equipment, wherein said at least one sensor includes a stroke-trajectory sensor;
graphically plotting said received sensor data on a user interface (UI) of a display screen for at least one shot played;
determining a first set of sensor data among said received sensor data that is received during a contact of said item of sports equipment with a moving object, wherein said first set of sensor data corresponds to a first set of timestamps at which said contact of said moving object with said item of sports equipment is detected;
analyzing, in real time, said first set of sensor data;
generating a current profile of a first player based on said analyzed first set of sensor data, wherein
said first player is associated with said item of sports equipment, and
said current profile of said first player indicates a performance of said first player;
comparing said current profile of said first player with a first profile of a second player;
determining a change in said performance of said first player based on said comparison and said analyzed first set of sensor data;
generating at least one recommendation based on said determined change in said performance of said first player; and
controlling said display screen of said electronic device to display said generated at least one recommendation, wherein
said generated at least one recommendation is displayed on said UI of said display screen.

9. The method as claimed in claim 8, further comprising generating said at least one recommendation based on comparison of said current profile of said first player with a historical profile of said first player.

10. The method as claimed in claim 8, further comprising dynamically generating said at least one recommendation based on a change in at least one physical attribute of said item of sports equipment, wherein
said change in said at least one physical attribute is detected based on comparison of said received sensor data with at least one threshold value.

11. The system as claimed in claim 1, wherein
said one or more circuits are further configured to categorize said received sensor data into said first set of sensor data associated with a first set of time periods and a second set of sensor data associated with a second set of time periods.

12. The system as claimed in claim 11, wherein
said first set of time periods corresponds to said first set of timestamps, based on detection of said contact between said moving object and said item of sports equipment, and
said second set of time periods corresponds to a second set of timestamps based on a lack of said contact between said moving object and said item of sports equipment.

* * * * *